United States Patent [19]

Lutz

[11] 3,824,563

[45] July 16, 1974

[54] DATA STORAGE TRACK PADDING APPARATUS

[75] Inventor: Fernando A. Lutz, San Jose, Calif.

[73] Assignee: International Business Machines Corporation, Armonk, N.Y.

[22] Filed: Apr. 13, 1973

[21] Appl. No.: 351,124

[52] U.S. Cl. ........................ 340/172.5, 340/174.1 G

[51] Int. Cl. ........................ G11b 5/00, G11b 27/10

[58] Field of Search ... 340/172.5, 174.1 R, 174.1 G, 340/174.1 H, 174.1 A, 174.1 K

[56] References Cited

UNITED STATES PATENTS

| | | | |
|---|---|---|---|
| 3,229,877 | 1/1966 | McLean et al. | 340/172.5 |
| 3,299,411 | 1/1967 | Capozzi et al. | 340/172.5 |
| 3,312,948 | 4/1967 | Capozzi | 340/172.5 |
| 3,331,053 | 7/1967 | Gindi | 340/172.5 |
| 3,439,344 | 4/1969 | Stanga | 340/172.5 |
| 3,490,013 | 1/1970 | Lawrance et al. | 340/172.5 |
| 3,533,071 | 10/1970 | Epstein | 340/172.5 |
| 3,623,039 | 11/1971 | Barham | 340/174.1 G |
| 3,699,527 | 10/1972 | Duerden | 340/172.5 |

*Primary Examiner*—Raulfe B. Zache
*Assistant Examiner*—John P. Vandenburg
*Attorney, Agent, or Firm*—John H. Holcombe; Edward M. Suden

[57] ABSTRACT

In data processing systems, several data storage files, such as disk files, are operated by a single, shared control unit for conducting normal read/write functions. Apparatus is located at and provided for each of the data storage files to assume control of the writing function from the control unit to pad a track with null characters from the end of the last record to a predetermined point on the track sensed by the file. The apparatus includes a local oscillator and apparatus for supplying the padding bits signals from the oscillator beginning with the termination of the control unit write gate signal for the track and continuing until a predetermined point of the track is detected. Apparatus is also provided for signaling the control unit that padding by the device is in progress and for signalling the control unit prior to the predetermined point.

13 Claims, 9 Drawing Figures

DATA STORAGE TRACK PADDING APPARATUS

FIELD OF THE INVENTION

The invention relates to data storage systems and more particularly to apparatus for controlling the data storage writing function.

BACKGROUND OF THE INVENTION

Tape or disk data storage systems have been developed which employ a single control unit to control the entire operation of a plurality of disk files. This allowed the substantial cost of electronics comprising the major part of the control unit to be distributed over a large number of files. The result was to reduce the unit cost of data storage on a storage capacity basis, such as cents per binary bit of storage capacity.

Most current data storage systems employ a format having records of variable, rather than fixed, length. With respect to disk files, the data capacity of each track is fixed. Thus, the storage of one or more records on a track necessarily results in an unused portion of the track remaining after the last record. This unused remainder must be padded or erased with a fixed pattern, usually zeroes, whenever the length of the records or the number of records on a track is changed. Records may be read and updated by being rewritten in all or part without a change in length, and therefore, not requiring padding. The change in length or change in number of records on a track is commonly called "format write" to distinguish from the normal updating write function.

Previously, all write data of either the updating or format type was supplied by the control unit to the desired file. As the result, the control unit was busy during the padding erase time and was unable to perform any other operation. The control unit was thus tied up and prevented from conducting productive data storage or retrieval functions. This has proven to substantially harm the system data processing "throughput".

SUMMARY OF THE INVENTION

It is therefore an object of the present invention to provide apparatus at the data storage file for performing the padding function and free the control unit for other operations during the padding time.

Briefly, the present invention comprises apparatus for each data storage file to assume control of the writing function from a control unit for padding the tracks with null characters. A local oscillator provides null character padding "bit" signals. A gating means is provided which responds to the termination of the last record on a track for gating the null character signals to the same track as the record data. The gating means continues the supply of padding bits until apparatus in the file signals that a predetermined index point on the track has been reached, thereby terminating the null character padding signals. Various communications may be provided with the control unit for signalling that padding by the device is in progress and for signalling the control unit prior to reaching the predetermined index point.

DESCRIPTION OF THE PREFERRED EMBODIMENT

Figure 1:
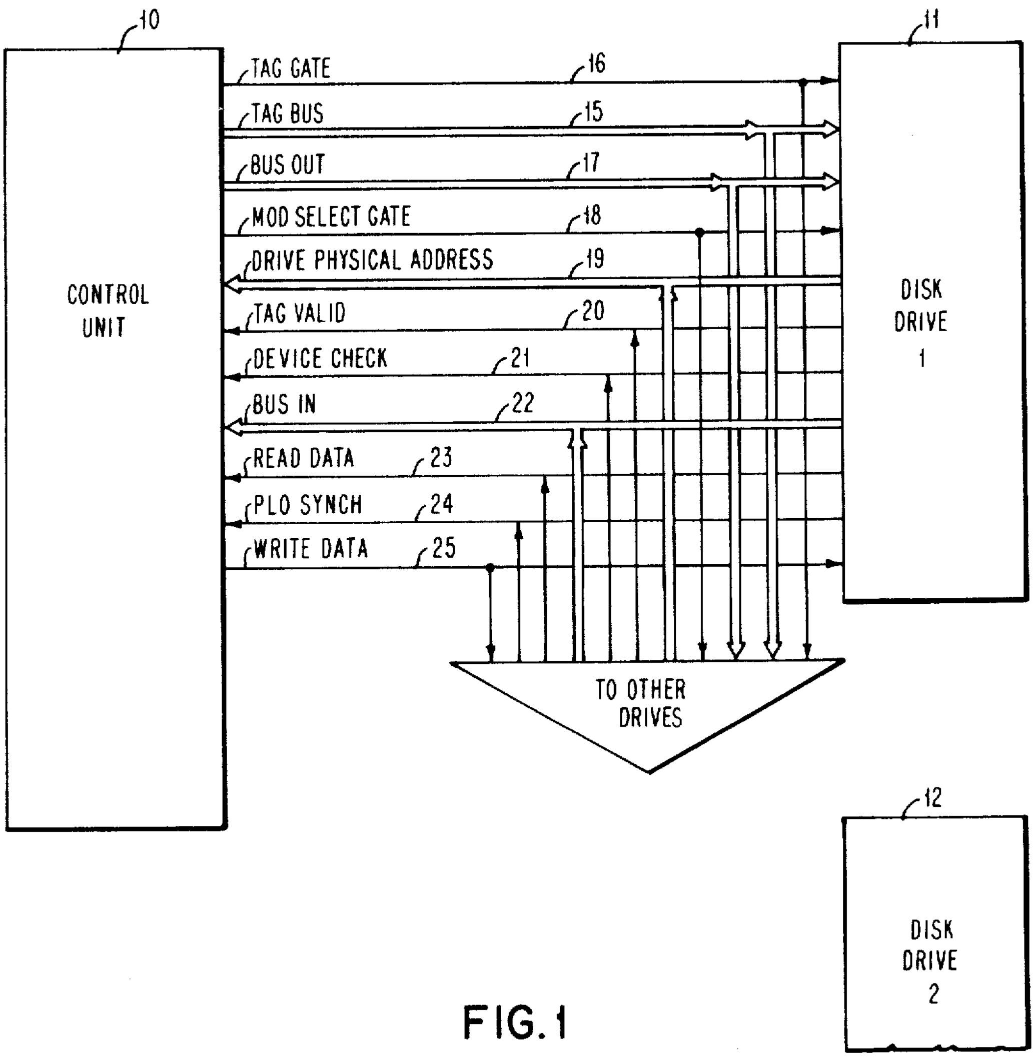
FIG. 1 comprises a block diagrammatic illustration of a control unit, data storage files employing the present invention, and the interconnections therebetween.

An exemplary data storage system is shown by reference to FIG. 1. That system includes a control unit 10 and a plurality of disk drives 11, 12. The control unit 10 may comprise, for example, the IBM 3830 File Control Unit and the disk drives 11 and 12 may comprise, for example, the IBM 3330 Disk Drives, both the control unit and disk drives being arranged in the 3330 Direct Access Storage Facility, commercially available from The International Business Machines Corporation since August 1971.

Interconnections between the control unit and disk drives include a "tag bus" 15 for sending commands to the disk drive and a "tag gate" line 16 to operate a gate circuit for the tag bus 15 in each of the disk drives. A "bus out" 17 supplies additional command information, and also provides the disk drive module number to select a specific drive. A "mod select gate" line 18 indicates to each drive that the information on bus out 17 is the drive selection information and maintains the established connection. Bus 19 returns the drive selection address to the control unit as an indication that the desired drive has been selected. Line 20 comprises an indication that tag information then on tag bus 15 has been decoded properly. "Device check" line 21 transmits signals from the selected disk drive to indicate that an error occurred or that the drive cannot respond in accordance with the control unit command. "Bus in" 21 transmits various operational data from the disk drive. "Read data" line 23 comprises the serial data read from a selected track of the selected disk drive. "PLO synch" line 24 comprises synchronizing data from the servo system of the selected drive to synchronize a phase locked oscillator in the control unit. Lastly, "write data" line 25 comprises the serial data from the control unit to be written on the selected track of the selected disk drive.

Figures 2, 2C:
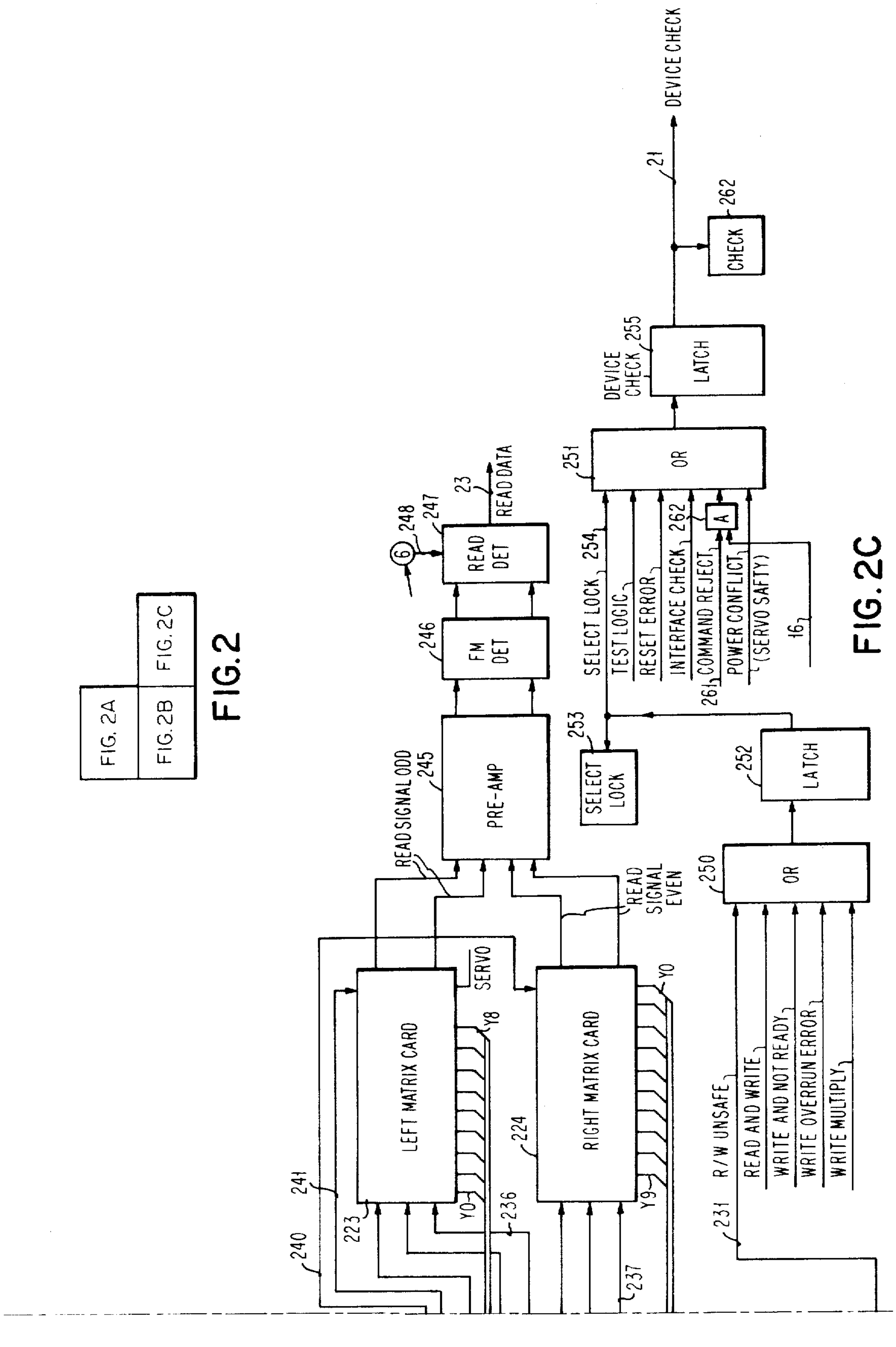
FIG. 2 comprised of FIGS. 2A–2C is a block diagrammatic illustration of apparatus comprising selected portions of one of the data storage files of FIG. 1 prior to the addition thereto of apparatus in accordance with the present invention.
Figure 2A:
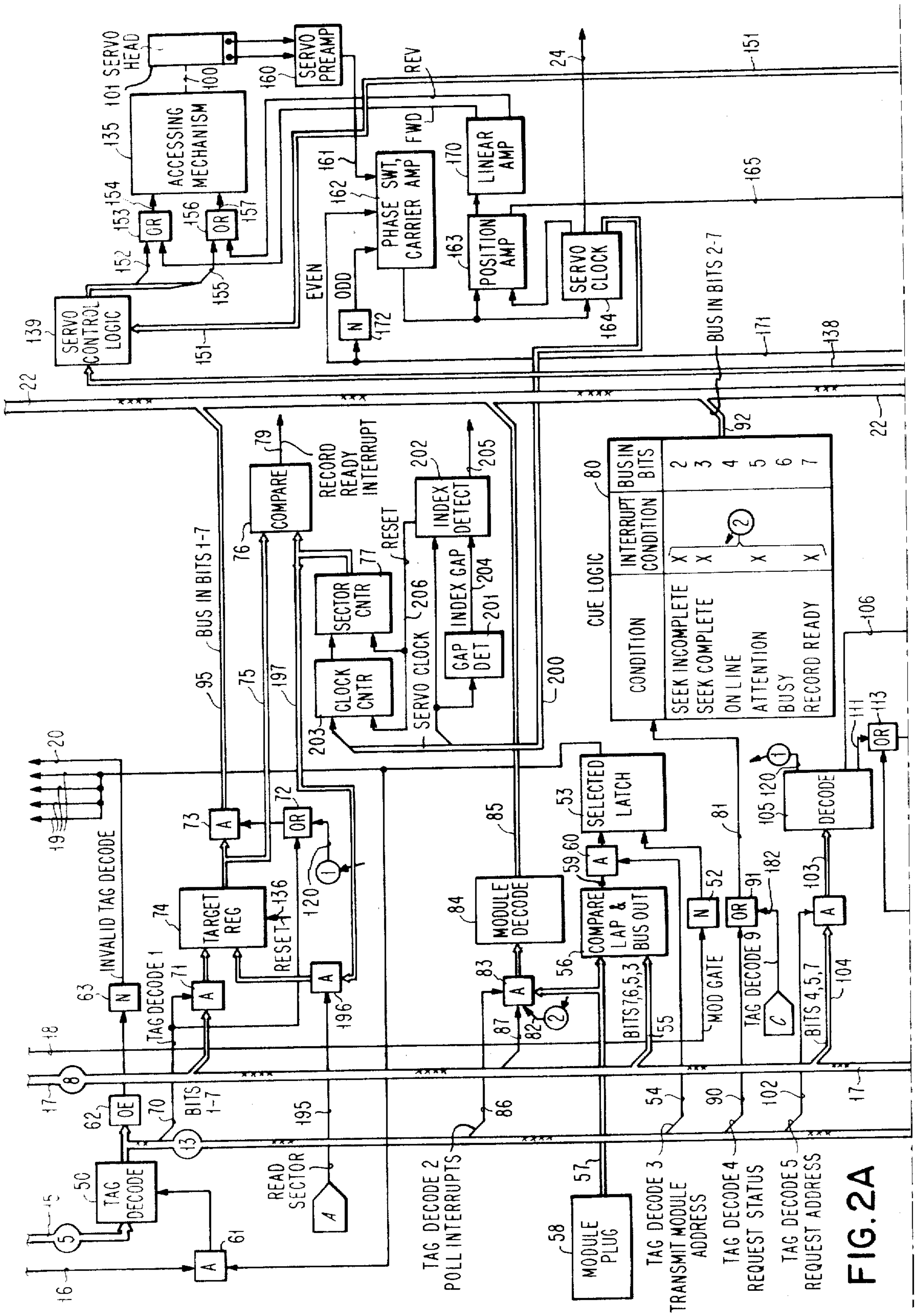
Figure 2B:
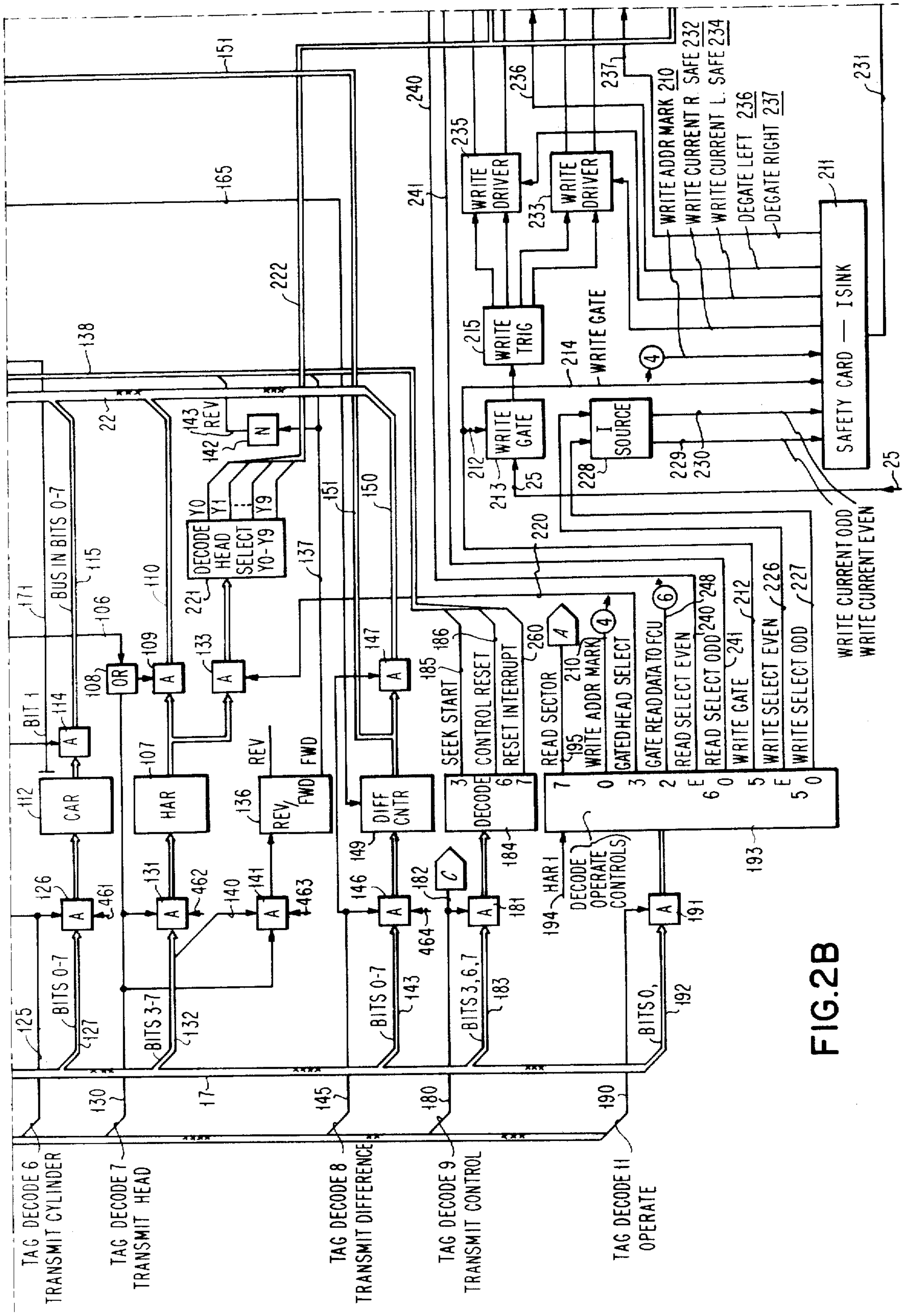

Referring to FIG. 2, tag bus 15 is connected to a tag decode circuit 50. Circuit 50 decodes the five binary bits appearing on the tag bus into a single bit on one of 13 output lines, numbered sequentially from 1 to 13. A gate line 51 is provided to the decode circuitry 50 for gating the decoded output signals. When no signal is supplied on line 51, most output lines from the decode circuit are blocked with the exception of tag decodes 2 and 3. As will be seen, this allows all devices to accept tag decodes 2 and 3 without having been selected as the active disk drive device by the control unit.

The selection of a specific disk drive by the control unit is initiated by the control unit's first dropping the signal on line 18 which is inverted by circuit 52 to reset latch 53 in whichever device was previously selected. Subsequently, the signal on line 18 is reestablished by the control unit to all disk drive files, resulting in circuit 52 in each file dropping the signal to circuit 53. At the same time, the control unit supplies the transmit module address tag on tag bus 15 to tag decode circuit 50 and supplies the designation of the desired disk drive module on bus out 17. Circuit 50 decodes the tag command on tag bus 15 and supplies a signal on line 54 comprising tag decode 3. The module designation appears on lines 3, 5, 6, 7 of bus out, which has a total of eight lines numbered 0 through 7 and are transmitted on lines 55 to compare circuit 56. The other input to the compare circuit 56 comprises lines 57 from a module plug 58, also called "logical address plug".

In only one of the plurality of disk drives 11, 12 will the encoded bits on the lines 55 correspond to the coded bits on lines 57. The comparison circuit 56 for that disk drive will then supply a signal on line 59 to AND circuit 60. The conjunction of signals on lines 54 and 59 operate AND circuit 60 to set latch 53 and thereby select that disk drive.

The output of latch 53 performs two functions. One function is to provide a signal on three out of the six lines comprising bus 19 in FIG. 1. The three lines comprise the physical address of the selected drive in a three-out-of-six code. This indicates to the control unit 10 that a drive has been selected and gives the physical address of that drive, which may be different from the address of the interchangeable module plug 58.

The other function of the output of latch 53 is to provide a signal at and circuit 61 to thereby gate all subsequent tag gate signals appearing on line 16 to input 51 of tag decode circuitry 50.

All further commands from the control unit will thereby be decoded only by the tag decode circuitry 50 and placed on the tag decode lines for the selected disk drive.

As the output of tag decode circuit 50 comprises one signal on only one of the tag decode lines, Exclusive OR circuit 62 provides an output signal so long as the proper decoding is made. Only when tag decode circuitry operates improperly to select more than one tag decode output line, will Exclusive OR 62 provide no output signal at the time of decoding. Thus, circuit 62 responds to the proper decoding of an input by continually supplying a "valid tag decode" signal on line 20 to the control unit 10. Only when the tag decoding is improper does circuit 62 terminate the signal on line 20.

The tag decodes will now be discussed in order, beginning with tag decode 1 on line 70. That tag decode is supplied to gate 71 and, via OR circuit 72, to gate 73. Gate 71 is thus operated to transmit any binary signals or bits appearing on lines 1 through 7 of bus 17 to register 74. Each disk of the disk drive contains 128 sectors. The control unit, by supplying both tag decode 1 and bits on lines 1 through 7 of bus 17, loads register 74 with the binary coded number of a desired sector. The desired sector number is supplied on bus 75 from register 74 to comparison circuit 76. The comparison circuit continually compares the desired sector number against the output of sector counter 77 appearing at bus 78. Upon the comparison circuit 76 indicating that the output of sector counter 77 is equal to the desired sector number, it supplies a "record ready interrupt" signal on line 79 to "cue logic" circuitry 80. The record ready interrupt signal supplied to circuitry 80 operates a latch which is supplied on line 82 to AND gate 83. The gate circuit is operated by tag decode 2 and bit 7, as will be described, to supply the output of the module plug on line 57 to module plug decoding circuitry 84. The decoding circuitry supplies a set of signals on bus 85 to bus in 22, which designate to the control unit that the disk drive module represented by module plug 58 has an interrupt condition.

The control unit may then determine the type of interrupt by supplying the "request status" tag on tag bus 15 together with a tag gate signal on line 16, which operates tag decode circuitry 50 to supply a signal on line 90 to OR circuit 91. The OR circuit transmits this signal to line 81 which gates any or all bits set in cue logic 80 on bus 92 to bus in 22, including the discussed "record ready" bit 7. The control unit will decipher the bit 7 appearing on bus in 22 as indicating that the desired sector set in register 74 has been reached as indicated by the sector counter 77.

The control unit periodically samples the interrupts of the various drives by supplying a "poll interrupt" tag on tag bus 15. Circuit 50 will decode the poll interrupt tag and supply a signal on line 86 without the necessity of the drive being previously selected by circuitry 53. This signal is accompanied by a signal on line 7 of bus out 17 from the control unit, which appears on line 87. The conjunction of signals on lines 86 and 87 together with an interrupt condition, such as presented by the record ready latch in cue logic 80 appearing on line 82, serve to operate AND circuit 83 to supply the signals for module plug 58 to module plug decoding circuitry 84.

In the exemplary disk file, the address of a particular track is designated by a combination of the cylinder address and head address. All of the heads are attached to carriage 100, including servo head 101, and are arranged in a vertical line. This vertical line intercepts the plurality of disks as they are rotating to define a cylinder. As the carriage mechanism is moved so that the servo head moves from one track to the next, the vertical line defined by the plurality of heads moves from one cylinder to the next. A cylinder address thus defines one of the plurality of concentric cylinders, and the head address defines the particular surface of a particular disk. The combined cylinder and head address thus comprises a single circular track on the surface of the disk.

The control unit may request the cylinder, head, or target address by supplying the "request address" command on tag bus 15 to tag decode circuit 50 together with the tag gate signal on line 16. This will operate tag decode circuitry 50 to supply a signal on line 102 to operate gate circuit 103. The control unit selects either the head, cylinder, or target address by supplying the respective one of bits 4, 5, or 7 on bus out 17 and wires 104, which is gated by circuit 103 to decode circuit 105.

The decode circuit 105 supplies a signal on line 106 in response to bit 4 to gate the contents of head address register 107. OR circuit 108 transmits the signal from line 106 to gate circuit 109 and thereby gates the contents of head address register 107, via bus 110 to bus in 22.

Decode circuit 105 responds to the appearance of bit 5 on bus 104 by transmitting a signal on line 111 to gate the contents of the cylinder address register 112. This is accomplished by OR circuit 113 transmitting the signal to gate 114. Gate circuit 114 then transmits the contents of the cylinder address register 112, via bus 115 to bus in 22.

Lastly, decode circuitry 105 responds to bit 7 on bus 104 by supplying a signal on line 120 to gate the contents of target register 74. This is accomplished by the signal on line 20 being transmitted via OR circuit 72 to gate circuit 73. The gate circuit supplies the contents of target register 74, via bus 95 to bus in 22.

The control unit may load cylinder address register 112 with a cylinder address by supplying the "transmit cylinder" command on tag bus 15 accompanied by the tag gate signal on line 16. The tag decoding circuitry 50 then supplies a signal on line 125 to OR circuit 113 and gate circuit 126. The control unit, if desiring to load the cylinder address register 112, also transmits the cylinder address on bus 17 to bus 127. The cylinder address is gated by gate circuit 126 to the cylinder address register 112. The output of the cylinder address register is supplied to gate circuit 114 which is operated by the same signal on line 125 to transmit the contents of the register on bus 115 to bus in 22.

The control unit may load head address register 107 by supplying the "transmit head" command on tag bus 15 accompanied by a signal on tag gate line 16. Tag decode circuitry 50 then responds by supplying a signal on line 130 to OR circuit 108 and gate circuit 131. The control unit may load head address register 107 by supplying the head address on bus out 17, bits 3 through 7, which are supplied on bus 132 to gate circuit 131. The gate circuit then transmits these bits to load the head address register 107. The output of head address register 107 has been supplied to gate circuit 133 and to gate circuit 109. Gate circuit 109 is similarly operated by the signal on line 130 to supply the contents of the head address register 107 on bus 110 to bus in 22.

The exemplary control unit is arranged to cause the seek operation from one cylinder to another to be done by commanding the access mechanism 135 to move forward or backward a specified number of cylinders. The forward or reverse signal is supplied by single-input flip-flop 136. When in one condition, flip-flop 136 supplies a forward signal on line 137, via bus 138, to servo control logic 139. The control unit may alter flip-flop 136 by supplying the transmit head command on tag bus 15 and tag gate signal on line 16 together with a signal on bit 0 of bus out 17. The tag decode circuitry 50 responds by supplying a signal on line 130 and the bus out bit 0 is supplied on line 140 to thereby operate gate 141 to signal flip-flop 136. The flip-flop then switches to the alternate condition. In the alternate condition, the flip-flop supplies no output causing inverter 142 to supply a reverse signal on line 143, via bus 138, to servo control logic 139.

The number of cylinders to be moved is under the control of the "transmit difference" command of the control unit. The control unit supplies this command on tag bus 15 together with a signal on tag gate line 16. Tag decode circuitry responds by supplying a signal on line 145 to gate circuit 146 and to gate circuit 147. The control unit supplies the desired number of cylinders to be moved on bus 17, which are supplied on bus 148 to gate 146. These bits are then gated to difference counter 149 to thereby load the counter. The output of the counter is gated by gate circuit 147, via bus 150, to bus in 22. The output of the counter is also supplied on bus 151 to servo control logic 139. Servo control logic 139 responds to the difference count and to the directional signal from circuit 136 to supply either forward or reverse drive signals via path 152, 153, and 154, or path 155, 156, 157 to accessing mechanism 135.

One of the disks of the disk file comprises a servo disk, which is continuously read by servo head 101. The servo head supplies its output signals to servo preamp 160 which supplies the resultant signal on line 161 to circuitry 162. That circuitry may adjust the phase of the servo signal and supply the resultant servo signal to position amplifier 163 and servo clock 164. As the accessing mechanism 135 moves the heads across the surfaces of the disks, position amplifier 164 detects the servo signals as each cylinder boundary is crossed and supplies a cylinder pulse on line 165 to difference counter 149, to thereby decrement the counter for each cylinder pulse. In this manner, the counter continually decrements as each cylinder is crossed until the count reaches zero. Upon reaching zero, no signals are supplied therefrom on bus 151 to servo control logic 139, and the servo control logic responds by supplying no further drive signals.

At this point, the accessing mechanism 135 becomes driven by linear amplifier 170 to center the servo head over a track. Alternate servo tracks are phased oppositely. Thus, circuit 162 must be provided with an indication whether the desired track is odd or even. This is accomplished by line 171 from cylinder address register 112. This line comprises a "1" bit if the track is even and a "0" (no signal) if the track is odd. Line 171 is connected directly to the even input of circuit 162 to supply a 1 bit thereto. Inverter 172 responds to any 0 bit by supplying a signal on line 173 to the odd input of circuit 162.

A "transmit control" command from the file control unit on tag bus 15 is, when accompanied by tag gate signal on line 16, decoded by circuitry 50 to provide tag decode 9 signal on line 180 to gate circuit 181. That signal is also transmitted on line 182 to OR circuit 91, thereby gating the contents of the cue logic 80 latches onto bus 92 and bus in 22 to the control unit.

Gate circuit 181 responds to the signal on line 180 to gate bits 3 or 6, if present on bus 183 from bus out 17 of the control unit, to decoding circuit 184. Bit 3 appearing on bus 183 results in circuit 184 supplying a signal on line 185 to cable 138. This signal is supplied to servo control logic 139 which indicates that the seek operation designated by the signals from reverse/forward circuit 136 and difference counter 149 is to be initiated. A bit appearing on line 6 of bus 183 is decoded by circuit 184 to place a signal on line 186 therefrom. This signal is supplied on cable 138 to servo control logic 139 to thereby cause the access mechanism 135 to retract the heads out of the stack of disks.

The file control unit may operate other aspects of the drive by supplying the "operate" command on tag bus line 15 together with the tag gate signal on line 16. Tag decode circuit 50 then supplies a signal on line 190 to gate circuit 191. The desired specific command or commands is then designated by the control unit in supplying the appropriate bit or bits on a predetermined one of the lines comprising bus out 17. This may comprise any of bits 0 through 7, shown as comprising bus 192. Gate circuit 191 supplies the particular bit on bus 192 to decoding circuitry 193. Another input to the decoding circuitry comprises line 194 from bit position 1 of head address register 107. This indicates whether the selected head is odd or even, as will be discussed.

Bit 7 on bus 192 causes the decoding circuitry 193 to supply a signal on line 195 to gate circuit 196. This signal indicates that the control unit desires to determine the sector of the disk file currently at the read heads. Operation of gate 196 therefore transmits the output of sector counter 77 on cable 197 to target register 74. The target register is thus loaded with the sector number which may be transmitted to the control unit on bus 22 upon the control unit supplying tag decode 5 and bus out bit 7 to decode circuitry 105 to thereby supply a signal on line 120 to OR circuit 72 and gate circuit 73.

An example of a sector detection system will now be described. As discussed above, servo preamplifier 160 supplies the servo signals from line 161 to circuit 162. The amplified servo signals are then supplied to servo clock 164. This clock supplies clock pulses derived from the servo signals on line 24 to the file control unit and on line 200 to gap detector 201, index detector 202 and clock counter 203. The servo disk has an index position at one angular point thereof which is indicated by means of absence of servo signals. Gap detector 201 detects the absence of servo signals and supplies a signal on line 204 to index detector 202. The index detector thereupon supplies a signal on line 205, as will be discussed. As soon as the servo clock pulses appear upon the ending of the gap, index detector 202 supplies an output signal on line 206 to the reset inputs of clock counter 203 and sector counter 77. The signal on line 206 resets the clock counter and sector counter to 0. Subsequent servo clock signals appearing on line 200 increment clock 203. Upon the clock counter reaching a predetermined value, the carry signal increments sector counter 77. Thus, each sector represents a predetermined number of servo pulses.

The output of sector counter 77 is also employed in the circuitry of FIGS. 3 through 6, as is line 205.

In response to the combination of tag decode 11 on line 190 and bit 0 on bus 192, decode circuit 193 supplies a signal on line 210 to an input of logic circuit 211. This signal causes the logic circuitry 211, if already in operation, to supply an appropriate current level to a selected write driver, as will be discussed, and to a selected head to thereby write a DC level on the disk. The DC level is called an "address mark." This signal is also employed in the circuitry of FIGS. 3 through 6.

Another write function besides the write address mark, is the writing of data. This is accomplished by the file control unit supplying tag decode 11 on line 190 accompanied by the operation of bit 5 on bus 192. The decode circuitry then supplies a signal on line 212 to write gate 213 and to input 214 of logic 211. Operation of write gate 213 allows the transmission of the write data from line 25 from the control unit to write trigger 250. Logic 211 will supply the appropriate write current to allow writing of the data. The write gate signal is similarly employed in the circuitry of FIGS. 3, 4 and 6.

The control over selecting the desired head to write the address mark or data is accomplished under the control of head address register 107 and bit 3 on bus 192 from the control unit. Bit position 1 of head address register 107 indicates whether the selected head is odd or even. If that bit is 0, the selection is an even head, and if that bit is 1, the selection is an odd head. That bit position is provided to decode circuitry 193 on line 194. Thus, the file control unit first supplies tag decode 11 together with bit 3 on bus 192 to decode circuitry 193. The decode circuitry then supplies the gated head select signal on line 220 to gate circuit 133. Operation of the gate circuit supplies the contents of head address register 107 to decode head select circuitry 221. Decoder 221 decodes the contents of register 107 to provide a signal on one of 10 lines comprising bus 222. Bus 222 is supplied to both matrix card 223 and to matrix card 224.

The head selection is employed for either reading or writing. If writing is desired, the control unit also supplies bit 5 on bus out 17. Decode circuitry 193 then responds to bit 5 on bus 192 and to the output of head address register bit position 1 on line 194 to provide a signal on the appropriate one of write select even line 226 or write select odd line 227. The selected line operates current source 228 to supply a write current on the appropriate one of write current odd line 229 or write current even line 230 to logic circuitry 211. Bit 5 from the file control unit on bus 192 also causes the supplying of a signal by decode circuitry 193 on line 212 to input 214 of logic circuitry 211. Logic circuitry 211 responds to the supplied signals to either supply an error signal on line 231 upon the occurrence of an error or supply the appropriate write current on either line 232 to write driver 233 or on line 234 to write driver 235.

Logic circuitry 211 also responds by dropping a signal on the appropriate one of degating lines 236 or 237. Thus, the appropriate write driver 233 or 235 and matrix guard 223 or 224 is operated in conjunction with the head selection signal on bus 222 to write the data supplied on line 25 onto the selected track, or to respond to a signal on line 210 to write an address mark.

The read function is similar in that the control unit must first supply the gated head select bit 3 signal on bus line 192 to cause circuitry 193 to supply a signal on line 220 and thereby cause the decoded signal to be supplied by circuitry 221 on bus 222 to select a desired head. The file control unit then supplies bits 2 and 6 on bus 192 to the decoding circuitry 193. The decoding circuitry responds jointly to bit 6 and the odd or even designation on line 194 from head address register 107 to supply a signal on the appropriate odd or even read select line 240 or 241. The signal thereby selects the appropriate head on matrix card 223 or 224 in conjunction with the selection signal on bus 222. The signals read from the selected track by the selected head are then supplied from the selected matrix card to preamplifier 245. The output of the preamplifier is supplied to an FM detector 246. The detected signals are then supplied to a read detector 247. The decoded output of bit 2 from bus 192, which was supplied with bit 6, causes circuit 193 to supply a signal on line 248 to read detector circuit 247. This signal causes the read detector to gate the decoded binary data from the selected head and track onto read data line 23 to the file control unit.

Various safety and error detection logic circuits are located throughout the machine and are supplied to OR circuits 250 and 251. Those supplied to OR circuit 250 operate latch 252 which sets indicator light 253 and supplies a signal on line 254 to OR circuit 251. The output of OR circuit 251 is then supplied to latch 255 which supplies a signal on line 21 to the file control unit.

Figure 3:
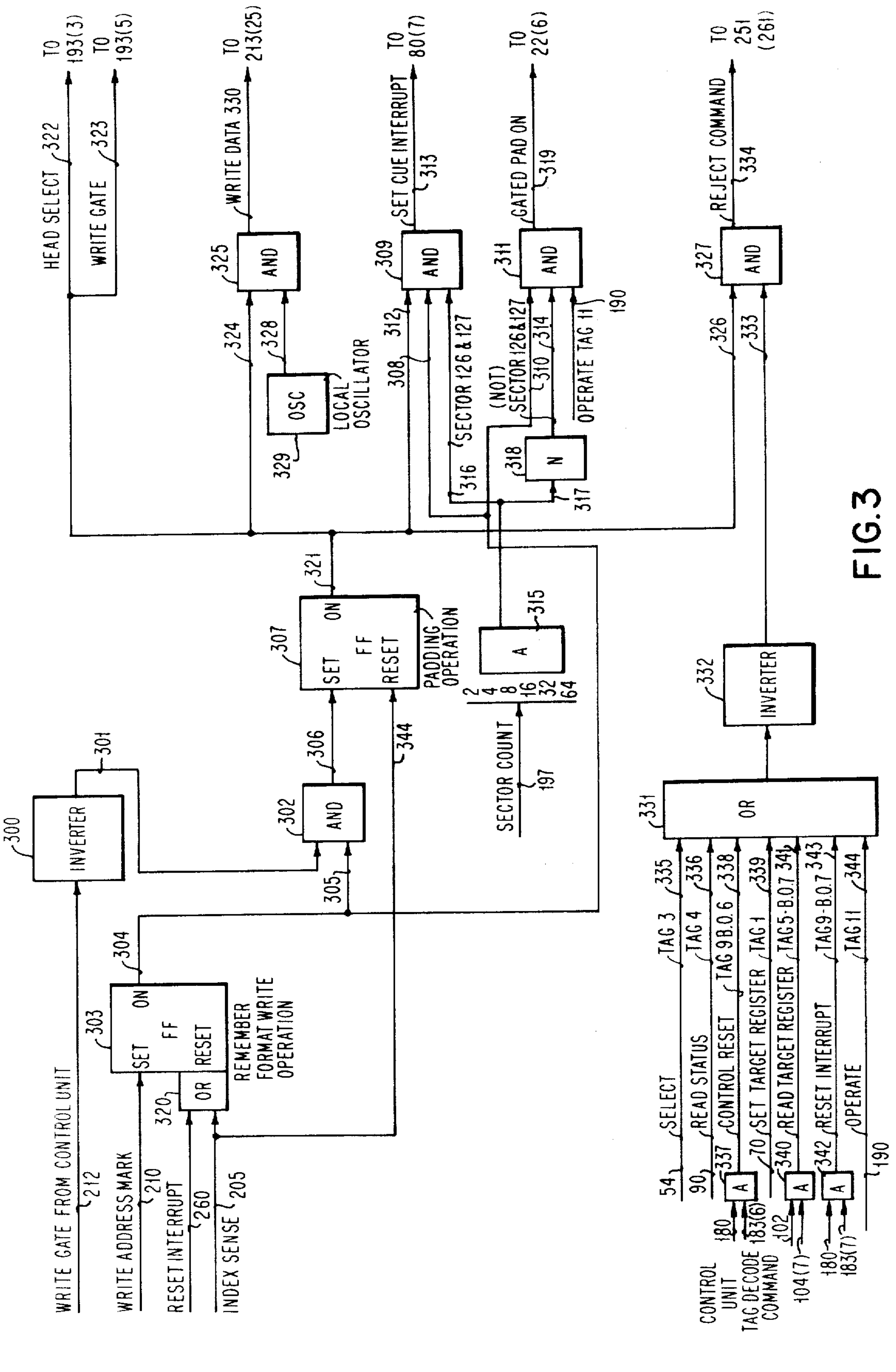
FIG. 3 comprises a block diagrammatic illustration of a preferred embodiment of specific circuitry arranged in accordance with the present invention for addition to the apparatus of FIG. 2.
Figure 4:
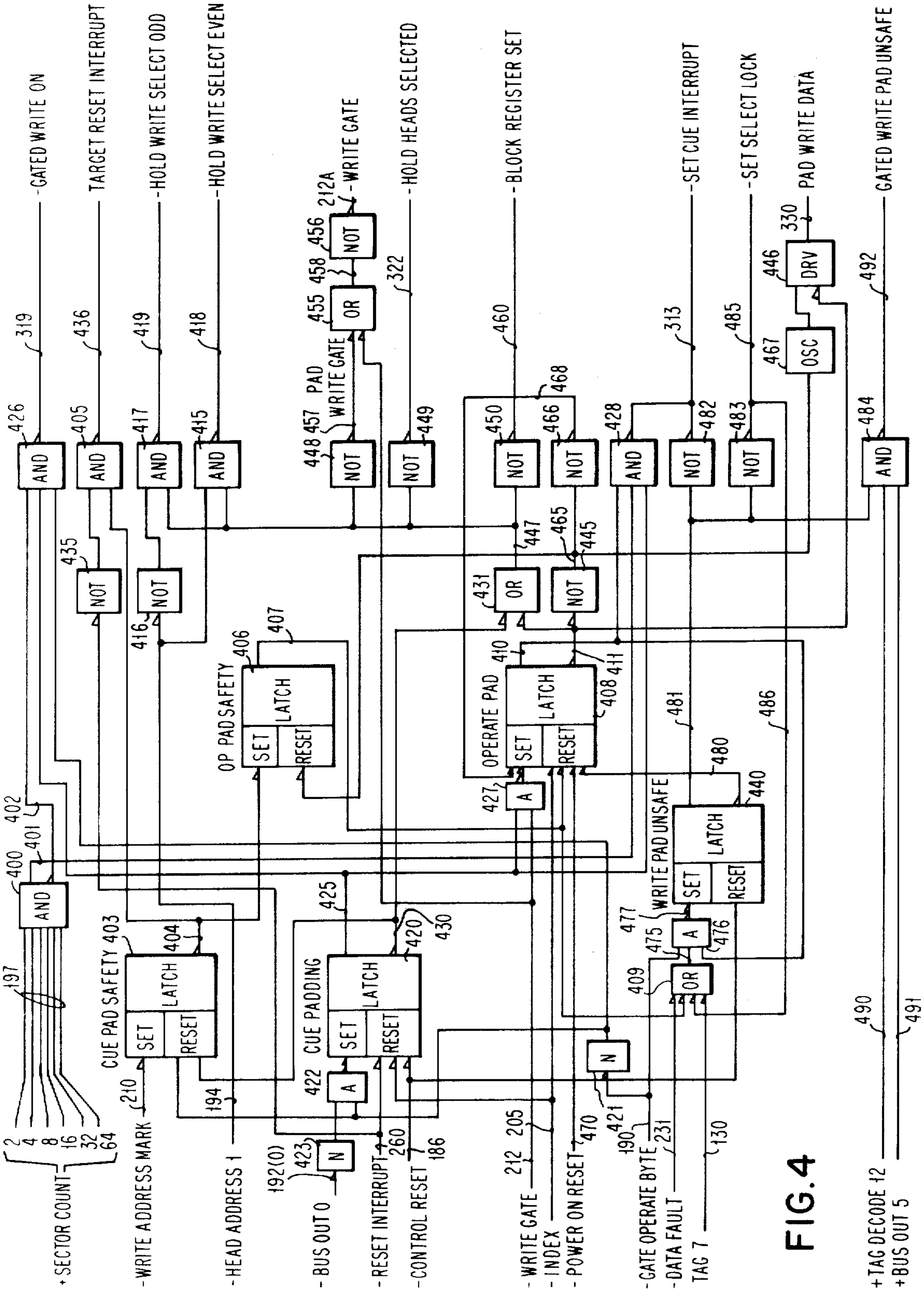
FIG. 4 comprises a detailed logic diagram of the preferred embodiment of FIG. 3 with additional safety features.

Circuitry present in FIG. 2, but not previously discussed, is employed to interface with the circuitry of FIGS. 3 and 4 and includes part of decode circuitry 184 for responding to the combination of tag decode 9 on line 180 and bit 7 on cable 183 to provide a reset interrupt signal on line 260.

Another line already in the device but not previously discussed is line 261, comprising an input to AND circuit 262. The output of the AND circuit is connected to OR circuit 251 and to device check latch 255. Line 261 is a command reject line which indicates that a command has been received from the file control unit which cannot be executed by the disk drive in its current status. The other input to the AND circuit comprises tag gate line 16 from the control unit. AND circuit 262 therefore only operates upon the actual receipt of a command from the control unit, which must be accompanied by a tag gate signal. Thus, when such a command has been received, the output from latch 255 is supplied on line 221 to the file control unit to indicate a device check, and is also supplied to circuit 262 which is wired throughout the disk drive to prevent a decoding of the command or a response to the command by circuitry 74, 84, 53, 80, 105, 112, 114, 107, 136, 149, 184, and 193.

Referring now to FIG. 3, circuitry to be added to that of FIG. 2 is illustrated to accomplish the function of writing null characters from the last record of a track being written to index.

As discussed previously, the writing of data in a disk file may be of two types, updating one or more records without rewriting the track, or rewriting an entire track. An entire track must be rewritten each time a variable length record is replaced. Without being rewritten, a new record would either leave part of the old record on the track or would write over not only the old record but possibly part of the immediately following record.

Referring to FIG. 2, the control unit first causes the disk file to be selected and to seek the desired track and then supplies the address of the desired head to head address register 107. Then, to signal that a track is to be rewritten, the control unit supplies the "operate" tag on tag bus 15 accompanied by a signal on tag gate line 16 to operate decoding circuitry 50, which supplies a signal on line 190 to gate circuit 191. In conjunction therewith, the file control unit supplies on bus out 17 bits 3 and 5 continuously, and supplies bit 0 at the beginning of each of the records to be written on the track. Circuit 191 gates these bits to decode circuitry 193. The decoding circuitry responds to bit 3 by supplying a signal on line 220 to gate circuit 133. This gates the output of head address register 107 to decode circuitry 221. The decode circuitry decodes the head address to provide a signal on the appropriate one of the head select lines 222 to matrix cards 223 and 224. Decode circuitry 193 responds to bit 5 from bus 192 together with the presence or absence of a bit on line 194 from head address register 170, bit position 1, to supply a signal on the appropriate one of lines 226 or 227 to current source 228. The current source responds by supplying the write current on the appropriate one of lines 229 or 230 to logic 211. Decode circuitry 193 further responds to bit 5 on bus 192 by supplying a write gate signal on line 212 to write gate circuit 213 and to input 214 of logic 211.

At the beginning of the first record comprising the track replacement, and at the beginning of each subsequent record, the control unit additionally supplies bit 0 on bus 192. Decoding circuitry 193 responds by supplying a signal on line 210 to logic circuit 211. This signal causes the logic circuit 211 to supply a direct current signal on the appropriate one of lines 232 or 234 to write driver 233 or 235 to thereby cause the head in the appropriate matrix card 223 or 224 to write a direct current signal on the track for the duration of the bit 0 signal on bus 192.

The write gate signal on line 212 from decoding circuitry 193 is also supplied to inverter 300 in FIG. 3. Inverter 300 responds by dropping any output signal on line 301 to AND circuit 302.

Write address mark line 210 from decode circuitry 193 in FIG. 2 is additionally connected to the SET input of two-input flip-flop 303 in FIG. 3. Thus, upon the file control unit supplying bit 0 on bus 192 subsequent to supplying bit 5, decode circuitry 193 supplies a signal on line 210 to flip-flop 303. This causes the flip-flop to turn ON and supply a signal on line 304 to input 305 of AND gate 302. This signal is blocked from transmission on output line 306 to similar flip-flop 307 by virtue of the lack of the signal on line 301 to AND gate 302. The signal on line 304 is also supplied on input 308 to AND circuit 309 and to input 310 of AND circuit 311. Another input to AND circuit 309 is input 312 from flip-flop 307. AND gate 302 prevents flip-flop 307 from being SET, so that no signal is supplied therefrom to input 312 of AND gate 309. Thus, AND gate 309 is prevented from supplying an output signal on line 313.

Other inputs to AND circuit 311 comprise line 314 and line 190 from FIG. 2. Line 190 comprises the "operate" tag decode 11 as decoded by circuitry 50. This tag is ON so long as the file control unit is controlling the write function. Here, the operate tag is used to sample whether padding by the file is advisable, as will be explained.

Sector counter 77 in FIG. 2 may, for example, comprise a binary counter. Assuming this is the case, all of the bit positions in cable 197 therefrom, with the exception of the lowest order bit position 1, are connected to AND gate 315 in FIG. 3. As discussed previously, the exemplary disk drive is arbitrarily divided into 128 sectors. These sectors are numbered consecutively from "0" to "127". Thus, AND gate 315 is operated only if all the bit position lines "2" through "64" connected thereto are ON. This occurs at the beginning of sector number 126. Subsequently, sector 127 is encountered, turning on the lowest order bit position 1, but AND gate 315 remains on. The AND gate is turned off only upon the resetting of sector counter 77. AND gate 315 therefore supplies an output signal on line 315 to AND gate 309 and on line 317 to inverter 318 during sectors 126 and 127.

The absence of a signal on line 316 prevents the operation of AND gate 309 until sector 126 is encountered. Inverter 318 thus supplies a signal on line 314 from sector 0 through 125, terminating that signal as sector 126 is encountered. This signal is supplied to AND gate 311 at input 314.

AND gate 311 operates to supply a signal on line 319 so long as the control unit supplies the operate tag 11 at line 190 after having additionally supplied a write address mark bit to decode circuitry in FIG. 2 prior to the occurrence of sector 126. Under these conditions, AND gate 311 indicates that the device is prepared to conduct the recording of null characters whenever the write gate bit from the control unit is dropped. The signal on line 319 is supplied directly to the control unit on bit 6 of bus in 22. This informs the file control unit that padding will occur in the disk drive so long as sector number 126 has not been encountered.

The function of AND circuit 309 is to provide a "record ready" interrupt signal to latch 7 of cue logic 80 upon encountering sector number 126 during the padding operation. The control unit may poll the interrupts and then request the status of the device to receive the "record ready" indication as previously described. The control unit will employ the record ready indication to begin implementing a new string of commands as soon as the index mark is encountered.

The time required for polling interrupts, requesting status, and getting the new commands to reconnect to the file and begin execution thereof is more than one sector time. This is why sector number 126 is used for AND circuit 309 rather than sector number 127.

As a corollary, if padding is conducted by the file, the control unit normally disconnects from the file to conduct other operations and, if there are further commands for the same file to be conducted immediately after index is sensed, the record ready indication from AND circuit 309 is required. Thus, if the last record written on the track extends into sector number 126 or 127, the control unit would be unable to react in time to disconnect, sense a record ready indication, reconnect, and begin execution at the beginning of the track. The system would then have to wait the entire revolution of the disk to encounter the index and begin execution of the new commands, a great waste of time.

If such new commands are to be executed next, the control unit therefore samples bus in 22, bit 6 from line 319 immediately prior to the end of the record to determine whether it is advisable for the file to conduct the padding. If a signal is present on line 319 at the time of sampling, sufficient time exists to allow the file to conduct the padding. If no signal is present, sector number 126 or number 127 has already been encountered and the control unit should retain control and conduct the padding.

The control unit retains control by continuing the "write" command bit 5 and "operate" tag 11 and supplies the null characters on line 25. As the write gate signal does not drop, the file padding will not operate as flip-flop 307 remains off. At index, flip-flop 303 will then be reset.

If no such new commands are to be executed, the control unit need not retain control even though sector number 126 is encountered, but may go on to initiate execution of commands for another file, etc.

Line 319 may also be used for another function as an alternative to the preceding paragraph. Specifically, if not all of the drives attached to the control are equipped with the circuitry of FIG. 3, they will have no line 319 and will therefore supply no signal on bus in 22, bit 6. The control unit may therefore sample bus in 22, bit b prior to the end of the last record every time padding is required. Thus, if no signal is present, either sector numbers 126 or 127 have been encountered or the drive does not have the circuitry of FIG. 3. Therefore, the control unit is forced to perform the padding function.

Under normal operation, the write gate signal 212 remains on during the time that the track is being rewritten and not padded by the file control unit, causing inverter 300 to prevent application of a signal on line 301 to AND gate 302. As the track is being rewritten, the write address mark signal will be supplied on line 210 at the beginning of each record on the track. Once this signal has SET flip-flop 303, the flip-flop remains on so as to supply a signal over line 304 to input 305 of AND gate 302.

Upon termination of the last record of the track, including any gap normally written after such records, the control unit drops the write gate signal. This is illustrated in FIG. 2 by dropping bit 5 on bus out 17, as illustrated on bus 192, and by dropping "operate" tag decode 11 which appeared on line 190 to gate the bits to tag decode circuitry 193. As this occurs, decode circuitry 193 drops the write gate signal on line 212 and the write select signal on either line 226 or line 227. In response to the dropping of the signal on line 212, inverter 300 in FIG. 3 supplies a signal on line 301 to AND gate 302. Flip-flop 303 has been supplying a signal to input 305 of the same AND gate, and the AND gate therefore supplies an output signal on line 306 to flip-flop 307. This signal turns flip-flop 307 on so that it supplies an output signal on line 321. This signal is transmitted to lines 322 and 323, to input 324 of AND gate 325, to input 312 of AND gate 309, and to input 326 of AND gate 327.

Line 322 is fed back to circuit 193 in FIG. 2 and applied to bit 3 thereof. Circuit 193 thus continues to supply a signal on line 220 to operate the head selection circuitry 221 and 223 or 224.

Line 323 is also fed back to circuit 193 and applied to bit 5 thereof. Termination of the operation of gate 191 does not affect the input line 194 from bit position 1 of head address register 107. Thus, the combination of the signal on line 323 with the signal, if any, on line 194 continues to operate the appropriate one of write select lines 226 or 227. Thus, current source 228 continues to supply the current over the appropriate line 229 or 230 to logic circuitry 211 which supplies the current to the appropriate write driver 233 or 235.

Bit 5 of circuit 193 as operated by line 323 in FIG. 3 is also connected to input line 212 of write gate 213 in FIG. 2 and to input 214 of logic circuitry 211. The write gate is thus maintained open to transmit any data supplied at input 25 to write trigger 215 and to the write drivers 233 and 235.

The write data is established in FIG. 3 by the signal supplied from flip-flop 307 at input 324 of AND gate 325. The other input to AND gate 325 is established on line 328 from the output of local oscillator 329. The oscillator 329 is designed to run at a frequency to supply output bits at the same nominal bit rate as a continuous string of zeroes would appear from the control unit on line 25. AND gate 325 transmits the string of zeroes from oscillator 329 to line 330. This line is connected to input line 25 to write gate 213 in FIG. 2.

Thus, the combination of signals on lines 322 and 323 in FIG. 3 serves to operate the writing circuitry in FIG. 2 to record the output of oscillator 329 on the selected track upon the termination of the write gate signal 212 for a track that is being rewritten as indicated by the write address mark signal on line 210.

As the padding operation is being conducted, it is desirable to prevent the disk device from responding to most commands supplied thereto by the file control unit. This is the function of AND gate 327 in FIG. 3.

A few incoming commands from the file control unit are connected, via OR circuit 331 to inverter 332. As most commands are not connected to the OR circuit 331, inverter 332 normally has no input thereto. In such cases, the inverter 332 supplies a signal to input 333 of AND gate 327. The other input to the AND gate is supplied from output 321 of flip-flop 307. This signal is turned ON with the initiation of the padding operation, as discussed above. Therefore, the signal is supplied at input 326 of AND gate 327 together with the signal from inverter 332 on input 333. The AND gate 327 thus supplies a reject command output on line 334 to input line 261 of and circuit 262 in FIG. 2.

As discussed, this prevents response by the device to any new commands from the file control unit.

Certain commands may be allowable while the disk drive is performing the padding function. These commands are connected to OR circuit 331. The first command is the "module selection" command comprising tag decode 3. This command is decoded by circuitry 50 in FIG. 2 to supply a signal on line 54. This line is also connected to input 335 of OR circuit 331. The OR circuit transmits the signal to inverter 332 which turns OFF the inverter so that no signal is supplied to input 333 of AND gate 327. This blocks the AND gate from supplying the command reject signal on line 333 to input 261 of AND circuit 262 in FIG. 2. Thus, latch 53 is allowed to respond to the selection bits on bus 55 and to the tag decode 3 signal on line 54 to operate latch 53 upon a comparison by comparison circuit 56.

Similarly, the "request status" command, which is decoded by circuitry 50 as tag decode 4 on line 90, is connected to input 336 of OR circuit 331. As before, this signal causes inverter 332 to block gate 327 so that no command reject signal is supplied to circuit 262 in FIG. 2. Thus, cue logic circuit 80 will respond to the input signal from line 90 on input 81 to transmit the status condition of the disk drive on bus 92 to bus in 22.

Still another command which is allowable is "control reset" which comprises the combination of tag 9, which is decoded to appear on line 180 in FIG. 2, together with bit 6 from bus out 17 which appears on cable 183 to decode circuitry 184. Lines 180 and bit 6 of cable 183 are also supplied to AND circuit 337 in FIG. 3. This AND gate then supplies a signal to input 338 of OR circuit 331. As before, the OR circuit turns OFF inverter 332 to prevent the supply of a reject command from AND gate 327. Thus, the control reset signal is allowed to be supplied by decoding circuitry 184 on line 186 in FIG. 2.

Another allowable command is the "set target register" command comprising tag 1 which is decoded by circuitry 50 in FIG. 2 to supply a signal on line 70. Line 70 is also connected to input 339 of OR circuit 331 to, once again, turn off the reject command signal on line 334 in FIG. 3 to allow operation of target register 74 in FIG. 2.

A related allowable command is to read the target register. This command appears as the combination of tag 5, which is decoded by circuitry 50 in FIG. 3, to a signal on line 102, in combination with a signal on bit 7 of bus out 17, which appears in cable 104. Line 102 and cable 104, bit 7, are both supplied to AND circuit 340. The AND circuit responds to these signals by supplying a signal on input 341 to the OR circuit 331. The OR circuit responds by causing the termination of the reject command signal on line 334 to thereby allow operation of decoding circuitry 105.

Another allowable command is that employed as the input to OR circuit 320 in FIG. 3. This comprises the reset interrupt and is the combination of tag 9 which is decoded by circuitry 50 in FIG. 2 to supply a signal on line 180 with a signal on bit 7 of bus out 17. This line of bus out 17 comprises a part of cable 183. These two lines are connected to AND circuit 342 in FIG. 3. The AND circuit responds to the two signals by supplying a signal at input 343 of OR circuit 331. Once again, this causes the reject command signal on line 334 to be dropped to thereby allow operation of decode circuitry 184 in FIG. 2. The decode circuitry responds by supplying a signal on line 260 to OR circuit 320 in FIG. 3. As padding has been initiated, the signal is employed to reset flip-flop 303 to block the set cue interrupt signal on line 313 by AND gate 309.

Lastly, an allowable command is the "operate" tag 11. It is allowable as it may be employed to test whether padding is in progress at AND gate 311. Before padding began, the "operate" tag was ON to control the writing function. When it dropped, the device padding began and the signal on line 319 dropped due to lack of an input on line 190 to AND gate 311. Thus, if the control unit canceled the provision for an interrupt on line 313, but subsequently desires to know whether padding is in progress, it supplies tag 11 without any accompanying bits on but out 17. Without any bits on bus 17, tag 11, as decoded by circuit 50 to provide a signal on line 190, does not supply any bits from circuit 191 to decode circuit 193. However, it is still necessary to prevent a device check signal from occurring on line 21. Therefore, line 190 is supplied to input 344 of OR circuit 331 to disable inverter 332 and thereby block the reject command signal from line 334.

The padding operation continues until the index mark is sensed at the end of the track. Approaching the end of the track, sector counter 77 in FIG. 2 will accumulate count until sector 126 is reached. At this state, all inputs to AND gate 315 in FIG. 3 are ON, causing the AND gate to supply an output on line 316 to AND gate 309 and on line 317 to inverter 318. Inverter 318 drops the signal on input 314 to AND gate 311.

At the same time, the signal on line 316 operates AND gate 309 so long as flip-flops 303 and 307 remain on, to provide a signal on line 313. This signal is supplied to the record ready position of cue logic 80 in FIG. 2. This comprises bit 7 of the cue logic and, as shown, also supplies an interrupt signal on line 82 to gate circuit 83. Thus, upon the file control unit polling interrupts, which is not prevented by the reject command signal, module decode circuit 84 will supply a signal on line 85 to bus in 22, designating the present disk drive as having an interrupt. A subsequent request status signal, allowable by OR circuit 331 in FIG. 3, will gate the status of the disk drive as represented in cue logic 80, via bus 92, to bus in 22. This serves as a signal to the control unit that index is about to be reached and the control unit may once again take control of the disk drive and continue its operation.

Upon gap detector 201 in FIG. 2 detecting the beginning of the index gap, it supplies a signal on line 204 to index detector 202. The detector supplies a signal on line 205 to OR circuit 320 aand to input 344 of flip-flop 307 in FIG. 3. This signal is also transmitted by OR circuit 320 to the RESET input of flip-flop 303.

Both flip-flop 303 and flip-flop 307 are thus RESET by the index sense signal to terminate the padding operation. This is accomplished by the termination of the output signal on line 321 from flip-flop 307 to head select line 322, write gate 323, input 324 of AND gate 325, input 312 to AND gate 309, and input 326 to AND gate 327. The termination of all these signals causes termination of the head selection signal on the appropriate line 226 or 227 from decode circuit 193 in FIG. 2, causes termination of the write gate signal on line 212 to write gate circuit 213 and input 214 to logic circuitry 211, terminates the supply of pulses from oscillator 329 to input 25 of write gate 213, causes termination of the interrupt condition signal at record ready bit 7 of cue logic 80, and causes termination of the reject command signal at input line 261 of OR circuit 251.

The disk drive thus resumes normal status awaiting further commands from the file control unit.

FIG. 4 comprises the electrical circuitry which is functionally the same as the logic circuitry in FIG. 3 with the addition of several safety features to insure against false operation of any of the circuitry of FIG. 3 or of FIG. 2.

In FIG. 4, cable 197, comprising the described outputs from sector counter 77 in FIG. 2 are supplied to AND circuit 400. The AND circuit operates only when all inputs thereto are positive. When operated, the AND circuit supplies a positive signal on line 401 and a negative signal on line 402. Thus, the signal on line 402 is normally positive until the AND circuit is operated.

The write address mark line 210 from FIG. 2 is connected to the SET input of latch 403. When operated by a negative signal on that line, the latch circuit 403 supplies a negative output signal on line 404. This signal is supplied to AND circuit 405 into the SET input of latch 406. Latch 406 is operated by the negative input signal to supply a positive output signal on line 407. This positive signal is supplied to the RESET input of latch circuit 408 and to OR circuit 409. The positive input to latch 408 has no effect since the latch is reset only by a negative-going signal. Assuming that latch 408 is in the reset condition, it supplies no positive signal on line 410 and no negative signal on line 411.

The circuitry of FIG. 4 does not supply a single head select signal as did the circuitry of FIG. 3 on line 322. Rather, a head select signal is supplied on the appropriate one of lines 226 or 227 of FIG. 2 to hold the head selection on. Therefore, line 194 from the head address register, which is shown as an input to decode circuitry 193 in FIG. 2, is supplied to AND circuit 415 and, via inverter 416, to AND circuit 417. Their outputs are supplied, respectively, on line 418 to line 227 and on line 419 to line 226.

The write address mark signal on line 210 in FIG. 4 is formed from the operation of decode circuitry 193 in FIG. 2. The decoding comprises decoding the combination of a signal on line 190 and a signal on bit 0 of cable 192. The circuitry in FIG. 4 duplicates that portion of the decoding circuitry in order to operate latch 420 and thereby provide a safety feature between latch 403 and latch 420. Specifically, the negative tag decode 11 signal on line 190 in FIG. 2 is supplied in FIG. 4 to inverter 421 which supplies a positive signal to AND circuit 422. The other input to the AND circuit comprises bit 0 of cable 192, comprising the write address mark bit, as inverted by inverter 423. The conjunction of the two positive signals from inverters 421 and 423 causes AND circuit 422 to supply a negative signal to the SET input of latch 420 to operate the latch.

Operation of latch 420 supplies a positive signal on line 425 to AND circuit 426, AND circuit 427, and AND circuit 428. Operation of latch 420 also supplies a negative output on line 430 to the RESET input of latch 403 and to OR circuit 431. The negative output on line 432 to the RESET input of latch 403 has no effect on that latch, since it is reset only upon the appearance of a positive-going signal threat.

Returning to the tag decode 11 signal on line 190 the negative signal is supplied to AND circuit 429, and inverter 421 also supplies its positive output to AND circuit 426 and to the reset input of latch 403. Under normal circumstances, this signal will be supplied prior to the write address mark signal on line 210. Therefore, tag decode 11 initially resets latch 403 so that it may be set at a subsequent time by a signal on line 210.

The reset interrupt signal on line 260 is supplied to the RESET input of latch 420 and also supplied, via inverter 435, to AND circuit 405. The output of AND circuit 405 comprises an additional line 436 to target register 74 in FIG. 2. This circuitry allows the reset interrupt signal on line 260 to reset the target register 74 to 0 so long as latch 403 is not ON to supply a blocking negative signal to AND circuit 405 on line 404.

Other, added circuitry includes line 186 from decode circuitry 184 in FIG. 2, comprising the control reset signal. This signal is supplied to the RESET input of latch 420 to block the cueing of any padding at that time, and is also supplied to the RESET input of latch a positive signal on line 410 to AND circuit 428 and AND circuit 429, and a negative signal on line 411 to OR circuit 431, inverter 445, and to driver 446. The negative signal to OR circuit 431 causes a positive signal to appear on line 447 to AND circuit 417, AND circuit 415, inverter 448, inverter 449, and inverter 450.

AND circuits 417 and 415 are arranged such that, upon head address bit position 1 line 194 indicating an odd head by a negative signal on line 194, this drives inverter 416 to operate AND circuit 417 to gate the output of OR circuit 431 on line 447. This supplies a signal on line 419 to line 226 in FIG. 2 to hold the operation of current source 228 in FIG. 2 to supply the write current on line 229 to logic circuitry 211. Should the head be even, the positive signal on line 194 operates AND circuit 415 to gate the output of OR circuit 431, to line 418 and to line 227 in FIG. 2. This signal thus operates the current source 228 to supply a signal on line 230 to logic circuitry 211.

To avoid the presence of any glitches between the dropping of the various outputs from decode circuitry 193 in FIG. 2 and the operation of the padding circuitry to maintain the head selection and write current operation, the circuitry of FIG. 4 is arranged alternatively to that in FIG. 3 by the provision of line 430 and OR circuit 431. The OR circuit is operated by the output signal on line 411 from operate pad latch 408, but is first operated by the output signal on line 430 from cue padding latch 420. Thus, OR circuit 431 provides a signal on line 447 significantly prior to the time of operation of latch 408.

Therefore, the output of inverter 448 cannot be supplied to bit 5 of decode circuitry 193 in FIG. 2 as was line 323 in FIG. 3. To do so would cause a feedback to occur on line 212 from the decode circuitry to AND circuit 427 in FIG. 4. Thus, the signal on line 212 would not terminate upon termination of bit 5 on bus 192 in FIG. 2 by the control unit. Latch 408 would therefore never be operated by AND circuit 427 and padding would not occur.

To avoid this situation, line 212 in FIG. 2 is broken prior to its input to write gate 213 and prior to connecting with input 214 to logic circuitry 211 in FIG. 2. This is illustrated in FIG. 4 by OR circuit 455 and inverter 456. Line 212 is connected to one input of OR circuit 455, and the other input thereto comprises line 457 from inverter 448. Therefore, either the appearance of a signal on line 212, or the operation of inverter 457 by operate pad latch 408 causes OR circuit 455 to supply a signal on line 458, via inverter 456, to line 212A. Line 212A represents the continuation of line 212 to write gate 213 and to input 214 of logic circuitry 211.

Upon operation of latch 420 or latch 408 to signal OR circuit 431, the output of inverter 449 is supplied on line 322 to line 220 in FIG. 2 to hold the head selection.

A new safety feature present in FIG. 4 comprises output line 460 from inverter 450. This line is connected in FIG. 2 to input 461 of AND gate 126, input 462 of AND gate 131, input 463 of AND gate 141, and input 464 of AND gate 146. The normal positive, non-padding output from inverter 450 allows normal operation of each of the described AND gates. However, upon operation of inverter 450 by cue padding latch 420 or operate pad latch 408, the signal provided by inverter 450 on line 460 causes each of the AND gates to block incoming signals. As described in FIG. 3, any attempt to operate those AND gates by the control unit will result in a command reject condition. To insure against any alterations of the register because of a slow operation of the command reject circuitry, the signal on line 460 will additionally block any signals from reaching any of the registers.

A signal on line 411 to inverter 445 in FIG. 4 operates the inverter to supply a positive signal on line 465 to the RESET input of latch 406, to inverter 466, and to oscillator 467. A positive signal applied to the RESET input of latch 406 has no effect thereat, since the input is responsive only to a negative-going transition. Thus, upon subsequent termination of the operation of latch 408, latch 406 will be reset.

The positive signal to inverter 466 is again inverted and applied on line 468 back to the SET input of latch 408. Due to the enormous powering requirements of latch 408, inverters 445 and 466, and line 468, comprise an additional latching arrangement to maintain the operation of latch 408 until reset. A positive output of inverter 445 on line 465 is also applied to enable the oscillator 467.

The gating of oscillator 467 is controlled by the signal on line 411 operating drive circuit 446. This circuit both gates the output of oscillator 467 and supplies sufficient drive and equalized characteristics to that signal on line 330 to input 25 of write gate 213 in FIG. 2.

An additional RESET input of latch 408 comprises line 470 from a manual switch on the disk drive which is used to initially turn on the power to the drive and to begin operation of the drive. Line 470 insures that latch 408 will be in the reset condition as power comes up in the drive.

Additional safety features comprise lines 231 and 130 to OR circuit 409. Line 231 comprises the read/-write unsafe output line 231 from logic circuitry 211 in FIG. 2. Line 130 comprises tag decode 7 as decoded by tag decode circuitry 50 in FIG. 2. Thus, on appearance of a signal on either of these lines, or by a signal on line 407 from safety latch 406, OR circuit 409 supplies a positive signal on line 475 to AND circuit 429. Other inputs to AND circuit 429 comprise decode tag 11 on line 190 from FIG. 2 and output 410 from latch 408 in FIG. 4. AND circuit 429 is responsive to positive signals, and thus will operate so long as OR circuit 409 is operated and latch 408 is operated, but so long as no tag 11 decode signal is provided on line 190. AND circuit 429 supplies a signal on line 477 to the SET input of latch 440. Operation of the latch provides a negative output on line 480 to the RESET input of latch 408. Thus, latch 408 is immediately reset before padding can occur. Latch 440 also supplies a positive output signal on line 481 to inverter 482, inverter 483, and AND circuit 484. Inverter 482 supplies a signal on line 313 to cue logic circuit 80 in FIG. 2. Inverter 483 supplies a signal on line 485 to OR circuit 250 in FIG. 2 and supplies a negative signal on line 486 to OR circuit 409 as a feedback latching arrangement to insure that OR circuit 409 remains activated until latch 440 is reset by the control unit.

Lastly, AND gate 484 allows a sampling by a diagnostic request from the control unit, comprising tag decode 12 from decode circuitry 50 together with a signal on bus out 17 bit 5. These have not been previously discussed, but are supplied on lines 490 and 491, respectively, to AND circuit 484. In response to these input signals and the operated condition of latch 440, AND circuit 484 supplies an output signal on line 492 to bus in 22, bit 1 to the control unit. This signal indicates that the reason for the interrupt occurring on line 313 was that the write pad unsafe latch 440 was operated.

The only circuit not previously discussed is AND circuit 428, which includes as inputs thereto, the output signal on line 410 from operate pad latch 408, output 401 from sector count AND circuit 400, and output line 425 from cue padding latch 420. Thus, upon the sector count reaching sector 126, in conjunction with the continuing operation of padding latch 408 and latch 420, AND circuit 428 supplies an interrupt signal on line 313 to the record ready latch of cue logic 80 in FIG. 2.

Some of the operation of the circuitry of FIG. 4 will now be discussed with respect to the timing diagram of FIG. 5.

The reject command circuitry of FIG. 3 accompanies the circuitry of FIG. 4, but is unchanged and therefore not repeated.

Figure 5:
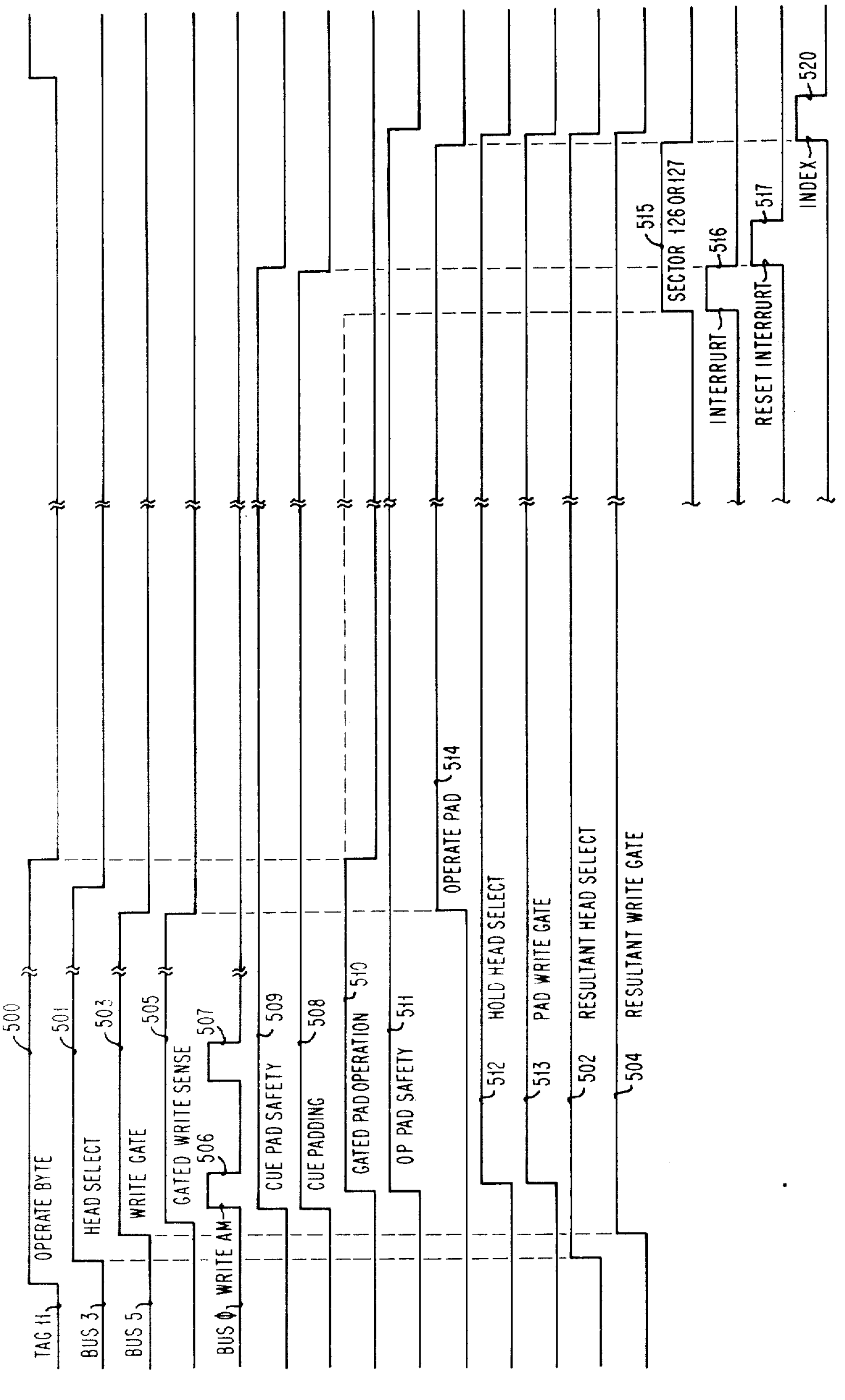
FIG. 5 comprises a timing diagram of various wave forms appearing in the operation of the apparatus of FIG. 4.

For the purpose of convenience in illustration, all of the signals shown in FIG. 5 are shown as positive-going when ON, whereas they may actually be either postive-going or negative-going when active. The first signal supplied by the control unit in writing a track is the "operate" tag 11. This tag is decoded by circuitry 50 to supply a signal 500 on line 190 in FIG. 2. In FIG. 4, the signal on line 190 is supplied to AND circuit 429 and to inverter 421. It is assumed that latches 406 and 408 are in the reset condition and that no signals are appearing at lines 231 or 130 to OR circuit 409. Therefore, no additional signals are supplied to AND circuit 429, so that the signal on line 190 has no effect thereat.

The signal from line 190 operates inverter 421 to supply positive outputs to the RESET input of latch 403, to AND circuit 422, and to AND circuit 426. This signal insures that latch 403 is reset, has no effect on AND circuit 422 in view of the fact that there is no input signal on line 192, bit 0, and has no effect on AND circuit 426 since latch 420 is assumed to be in the reset condition.

Signal 500 operates gate circuit 191 in FIG. 2 to gate signal 501 from bus out 17 bit 3, appearing on cable 192 to decode circuitry 193. The decode circuitry responds by supplying an output signal on line 220 to gate circuit 108. This circuit gates the output of head address register 107 to decode head select circuitry 221. This circuit supplies a signal 502 on the appropriate one of the lines in cable 222 to matrix cards 223 and 224 for selection of one of the heads thereat.

The next signal supplied by the control unit is bit 5 on bus out 17. This signal appears on cable 192 and is gated by gate circuit 191 to decode circuitry 193. The signal is shown as signal 503 in FIG. 5 and is decoded by circuitry 193 to supply a write gate signal 504 on line 212, via OR circuit 455, inverter 456 and line 212A, to write gate 213 and to input 214 of logic circuitry 211. Signal 503 additionally combines with the signal appearing on line 194 from the head address register, bit 1, to supply a write select signal on either of lines 226 or 227. The appropriate signal drives current source 228 to supply write current on the appropriate line 229 or 230 to logic circuitry 211. The logic circuitry decodes these signals to supply write current on the appropriate ones of lines 232 or 234 to write drivers 233 or 235 and also degates the appropriate one of lines 236 or 237 to thereby select the appropriate matrix card 223 or 224.

Subsequently, the disk drive will either sense the index, if the "format write" is to be of the entire track, or appropriate sector count, if only the last record is the subject of a "format write", and supply the appropriate signal on line 79 or line 205 to cue logic 80 and thereby supply a signal on line 82 to gate circuit 83. By subsequently polling interrupts, the control unit will operate gate circuit 83 to transmit the disk drive address on cable 85 to bus in 22 of the control unit. This is represented as signal 505 in FIG. 5.

When in "format write" mode, the control unit responds by supplying a signal on bit position 0 of bus out 17 at the appropriate time for writing an address mark at the beginning of each record. This signal, appearing as signal 506 for the first record and 507 for the second record, is gated by circuit 191 from cable 192 to decoding circuitry 193. The decoding circuitry supplies an output signal on line 210 to logic circuit 211. Logic circuit 211 responds by supplying a direct current on the appropriate line 232 or 234 to the appropriate write driver 233 or 235 to cause the selected head to write an address mark.

The signal on bit 0 of bus 192 is also supplied to inverter 423 in FIG. 4. The inverter then supplies a positive signal to AND circuit 422. As the "operate" signal 500 is appearing on line 190 at the same time, inverter 421 is supplying a positive signal to AND circuit 422. The AND circuit therefore operates and supplies a signal to the SET input of latch 420. This causes the latch to be set and supply a positive output signal 508 on line 425 and a negative output signal on line 430. At approximately the same time, the write address mark signal is supplied on line 210 to the SET input of latch 403, thereby causing the latch to supply a negative signal 509 on line 404.

The negative output signal 508 from latch 403 on line 404 is also supplied to the SET input of latch 406. This signal therefore causes the latch to supply a positive output signal 511 on line 407. This signal has no effect on latch 408 since only a negative-going signal will reset the latch. As the latch is assumed to already be reset, signal 511 will operate OR circuit 409, but the lack of a signal on line 410 will block AND circuit 429.

The positive output 509 on line 425 from latch 420 is supplied to AND circuit 426. Assuming that sector 126 has not yet been reached, AND circuit 400 also supplies a positive signal on line 402 to AND circuit 426. As signal 500 is still present on line 190, inverter 421 supplies a positive signal to AND circuit 426. As all inputs to AND circuit 426 are positive, the AND circuit supplies a negative output signal 510 on line 319 to bus in 22 bit 6 to the control unit. This signals that the disk drive will accomplish the padding function.

The negative output on line 430 from latch 420 is supplied, via OR circuit 431 and line 447, to AND circuit 417, AND circuit 415, inverter 448, and to inverter 449. Inverter 416 and AND circuits 415 and 417 respond to the combination of the signal on line 447 with the presence or absence of a signal on line 194 to provide a negative output signal on the appropriate one of lines 418 or 419 to the appropriate one of lines 226 or 227 in FIG. 2 to hold the write selection of current source 228 at the appropriate odd or even matrix card 223 or 224. Inverter 449 responds to the same positive signal on line 447 to supply a negative output signal 512 on line 322 to line 220 in FIG. 2. This signal maintains the operation of gate circuit 110 to maintain the proper head selection by decode circuit 221.

Inverter 448 responds to the signal on line 447 from OR circuit 431 by providing pad write gate signal 513 on line 457. This signal has no effect on OR circuit 455, which is already operated by the write gate signal on line 212 to supply a write gate signal on line 212A.

After the control unit has written the last record on the desired track, it terminates wrte gate signal 503 on bus out bit 5, causing decode circuitry 193 to drop the corresponding signal on lines 212 and either of lines 226 or 227. The circuitry of FIG. 4 holds these signals by means of the signals appearing on line 457 and either of lines 418 or 419.

The dropping of the write gate signal 503 on line 212 to a positive state operates AND circuit 427 in FIG. 4 to supply a negative signal to the SET input of latch 408. This operates the latch to provide a positive output signal 514 on line 410 and a negative signal on line 411. The negative signal on line 411 is supplied to OR circuit 431 to thereby maintain the input signals to AND circuits 415 and 417 and to inverters 448, 449, and 450. The negative signal on line 411 is also supplied to inverter 445 which supplies a positive output signal on line 465 to initiate operation of oscillator 467. The negative signal on line 411 is also supplied to driver 446 which gates the output of oscillator 467 to line 330 and line 25 to write gate 213. The control unit subsequently drops the signal on bus out 17 bit 3 shown as signal 501 in FIG. 5. Decode circuitry 193 therefore terminates the output signal on line 220, but this signal is held on by the output of inverter 449 on line 322 to line 220.

Next, the control unit drops tag 11 appearing on line 190 to thereby block operation of gate 191. Dropping of the signal on line 190 affects FIG. 4 by allowing operation of AND circuit 429 should an unsafe condition exist, and terminates operation of inverter 421. A dropping of a positive signal from inverter 421 blocks further operation of AND circuit 426 to thereby terminate the output signal on line 319 to bus in 22 bit 6, illustrated as signal 510 in FIG. 5. As illustrated by the dotted line subsequent to the termination of signal 510, an alternative is that sector 126 will be reached prior to termination of tag 11 by the control unit. This will be the case where the track written by the control unit enters or nearly enters sector 126. Upon encountering sector 126, the sector count provided by sector counter 77 in FIG. 2 comprises positive signals on each of the lines 197 to AND circuit 400. AND 400 responds to all positive inputs by supplying a positive output signal 515 on line 401 and a negative output signal on line 402. The negative output signal then blocks the operation of AND circuit 426 to terminate signal 510 on line 319. As discussed previously, if the file control unit is to execute commands relative to the same file immediately after index is encountered, the control unit may sample bus in 22 bit 6 for a signal on line 319 immediately prior to the end of the record. If no signal is present thereat, the last record has extended into sector number 126. The control unit will thus maintain write gate 503 and supply the null characters for padding.

Alternatively, upon encountering sector 126, the positive signal 515 on line 401 from AND circuit 400 operates AND circuit 428 to supply a negative interrupt signal 516 on line 313 to cue logic circuit 80, bit 7. This is in the alternative to the above, because upon the control unit writing into sector number 126, latch 408 will not be operated by termination of the write gate signal and AND circuit 428 will be blocked.

Bit 7 comprises the record ready interrupt and supplies a signal on line 82 to gate circuit 83 in FIG. 2. In quick succession, the control unit supplies the poll interrupts decode 2 accompanied by bit 7 on bus out 17 to operate gate circuit 83 and transmit the module indicator from module decode circuitry 84 on bus in 22 to the control unit. The control unit may then respond to the designation of the disk drive having the interrupt by transmitting the request status tag decode 4 which operates cue logic 80 to transmit the record ready bit 7 on cable 92 to bus in 22. Upon receipt of the status, the control unit supplies tag decode 9 accompanied by bit 7 to thereby operate decoding circuitry 184 to supply the reset interrupt signal 517 on line 260. This signal is supplied to the RESET input of latch 420, which resets the latch to terminate signal 508 therefrom on line 425 and to terminate the negative signal on line 430. Termination of the negative signal on line 430 supplies a positive-going signal to the RESET input of latch 403. This resets the latch to terminate signal 509 on line 404 therefrom. Termination of the signal on line 404 therefore operates AND gate 405 so that any subsequent reset interrupt signals will be allowed to reset the target register to 0. Termination of the output of latch 420 on line 425 also terminates operation of AND circuit 428 to thereby terminate the interrupt signal 516. Thus, the interrupt has been reset.

Upon the disk file reaching the index point, index detector 202 will supply an index signal 520 on line 205. This resets sector counter 77 to 0, thereby terminating output 515 on line 401 from AND circuit 400. The index signal on line 205 also resets latch 420 if that latch had not been previously reset by a reset interrupt on line 260. In addition, the index signal on line 205 is supplied to the RESET input of latch 408 to thereby reset the latch and terminate signal 514 on line 410 therefrom.

Termination of the output 514 from latch 408 causes a positive signal to be supplied to OR circuit 431, inverter 445, and driver 446. As circuit 420 was previously reset, this terminates operation of OR circuit 431 so that it supplies a negative output to AND circuits 415 and 417 and inverters 448, 449, and 450. AND circuits 417 and 415 therefore terminate the appropriate hold select odd or even signal 502 on line 418 or 419. The operation of inverter 449 is also terminated to thereby terminate signal 512 on line 322 to line 220 and thereby terminate the holding of the selected head. Termination of the operation of inverter 448 also terminates operation of OR circuit 455 in that the other input thereto, write gate signal 503 was previously terminated. Thus, write gate signal 513 is terminated and no write gate signal is supplied on line 212A.

The termination of the signal on line 411 also terminates the gating action of driver 446 to therefore terminate any pad write data on line 330 to input 25 on write gate 213. Lastly, the termination of the signal on line 411 terminates the output of inverter 445 on line 465, causing a resultant negative-going signal to be applied to the RESET input of latch 406. This causes the latch to reset and terminate signal 511 on line 407 therefrom.

The alternative circuitry of FIG. 6 will now be discussed with respect to that of FIG. 3 to point out the differences.

Figure 6:
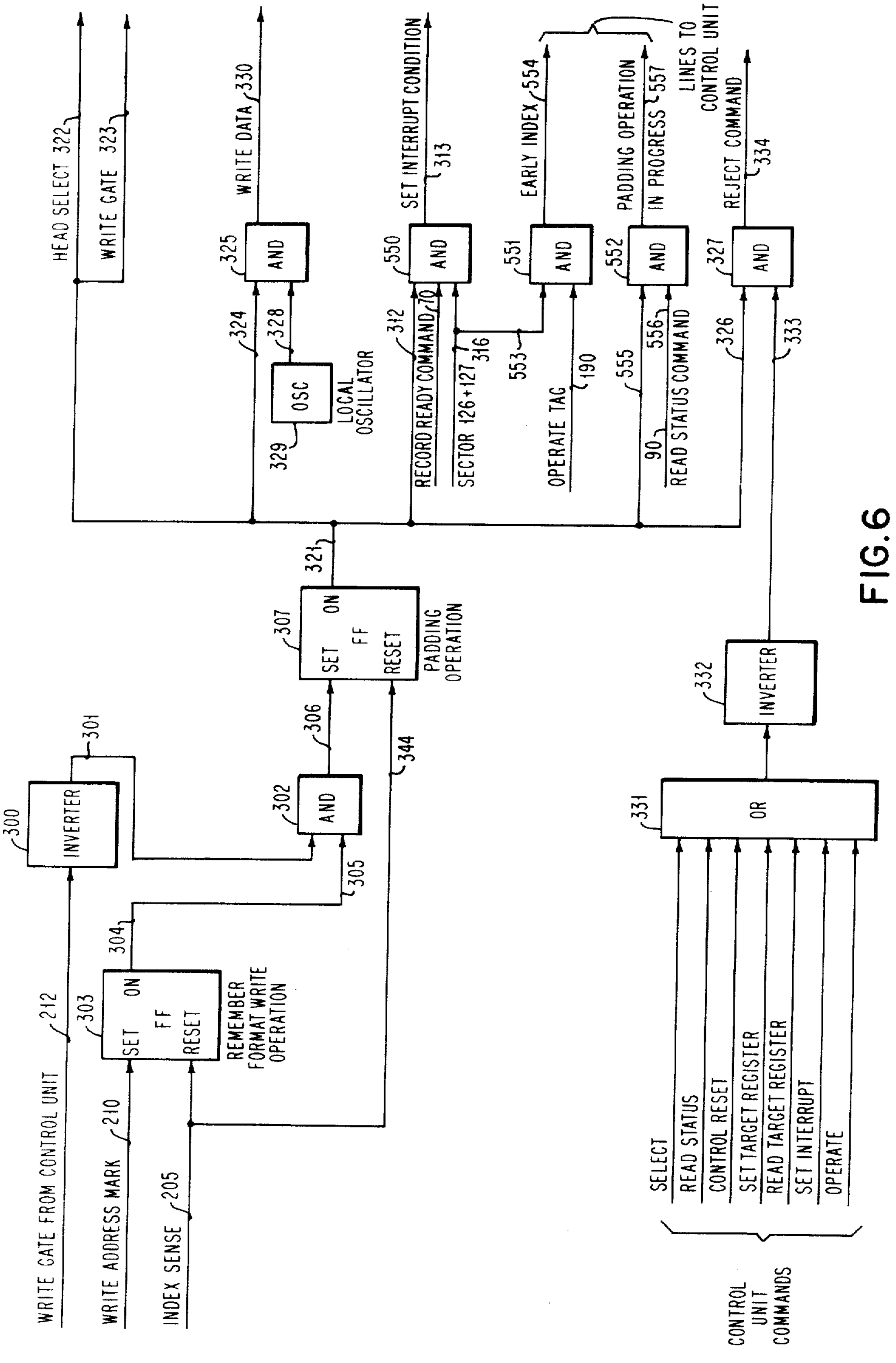
FIG. 6 comprises a block diagrammatic illustration of an alternative preferred embodiment of specific circuitry arranged in accordance with the present invention for addition to the apparatus of FIG. 2.

Most of the circuitry is the same as between FIG. 3 and FIG. 6. One difference comprises the lack of application of the reset interrupt signal from line 260 to the RESET input of flip-flop 303. Thus, flip-flop 303 remains in the set condition until reset by an index sense appearing on line 205. It may not be reset prior to that time by the reset interrupt signal 517 of FIG. 5.

In addition, the output 304 from flip-flop 303 is supplied only to input 305 of AND circuit 302. It is not additionally supplied as an input to AND circuit 309 and as an input to AND circuit 311. The functions of AND circuits 309 and 311 have been changed in FIG. 6 and are therefore renumbered to, respectively, 550 and 551.

In the circuitry of FIG. 3, AND circuit 309 supplied an interrupt condition signal to cue logic 80 upon encountering secotr 126 while padding was in progress and without flip-flop 303 having been reset. In FIG. 6, AND circuit 550 supplies the same cue interrupt signal on line 313 upon encountering sector 126 when padding is in progress, but only upon receipt of a tag decode 1 signal at the disk drive on line 70 in FIG. 2. Thus, the interrupt signal is not automatic unless previously reset by the control unit, as was the case in FIG. 3. In FIG. 6, the interrupt condition is set only if ordered by the control unit.

AND circuit 311 in FIG. 3 supplied an indication by lack of a signal on line 319 that the control unit should accomplish the padding function, as explained above, because sector number 126 has been reached.

In FIG. 6, AND circuits 551 and 552 perform slightly different functions. AND circuit 551 responds to the "operate" tag 11 on line 190 together with the output from the sector counter on line 316 to input 553 of the AND circuit, this input indicating that sector 126 or 127 is currently under the head and too late for the file to conduct padding if the control unit will require reconnection for commands immediately subsequent to index. AND circuit 551 responds by supplying an output signal on line 554 to bus in 22 to the control unit irrespective of whether padding is in progress. The signal on line 554 simply comprises an indication that the index mark is within 2 sectors of the head.

AND circuit 552 is an additional circuit over that of FIG. 3. When the padding operation is in progress, flip-flop 307 supplies an output signal on line 321 to input 555 of the AND circuit. The control unit may thus sample whether padding is in progress by supplying a read status command signal, comprising tag decode 4 on line 90 in FIG. 2. This signal is applied to input 556 of AND circuit 552, thereby operating the AND circuit to supply an output signal on line 557 to the control unit.

The functions of AND circuits 550, 551, and 552 are thus similar to those of AND circuits 309 and 311 in FIG. 3. AND circuits 311 indicates that conditions allow engagement of the file padding function because sector number 126 has not been reached. The absence of the signal on line 319 indicates it is too late to utilize the internal function or that the device does not have it installed. AND circuit 309 supplies an interrupt signal upon encountering sector 126 when padding is in progress so long as the control unit allows that interrupt by not resetting flip-flop 303.

In FIG. 6, AND circuit 552 indicates that padding is in progress whenever requested to so indicate by the control unit supplying the read status command on line 90.

AND circuit 551 supplies the signal whenver sector counter 126 is encountered when requested to do so by signal on line 190.

Here, the absence of a signal on line 554 indicates that conditions allow engagement of the file padding function because sector number 126 has not been reached. The presence of a signal on line 554 indicates it is too late to utilize the internal function if immediate reconnection is to be made to the drive. In this embodiment, the control unit must be previously aware that the file has the circuitry of FIG. 6 installed, as line 545 does not provide this indication. AND circuit 550 supplies an interrupt signal upon encountering sector 126 when padding is in progress and when requested to do so by record ready command on line 70 from the control unit.

The head selection, write data, and command reject circuitry in FIG. 6 is the same as that in FIG. 3.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus within a disk file for assuming control of the disk file from a control unit at the end of the last format write operation being performed under control of the control unit so as to release the control unit for operation with other disk files attached to that control unit, said apparatus performing a padding to index operation independent of the control unit, the apparatus comprising:
- a local oscillator for producing null characters;
- first means for determining the end of the last format write operation;
- second means connected to said first means for maintaining the status within the disk file to be the same status as existed during the last performed format write operation;
- gate means connected to the local oscillator and the first means for gating the output of the local oscillator to the write circuitry within the disk file until he occurrence of the next index signal is sensed by the disk file for recording the null character signals so as to perform the padding to index operation independent of control of the control unit associated with that disk file.

2. The apparatus as set forth in claim 1 further comprising:
- a sector decoder for generating a signal indicative of the relative position of the next index pulse to the sector now being operated upon by the read/write circuitry associated with the disk file.

3. The apparatus as set forth in claim 2 further comprising:
- third means connected to said sector detector and said first means for generating a signal to the control unit for indicating that a padding to index operation will occur upon the conclusion of the last format write operation to be performed under the control of the control unit.

4. The apparatus as set forth in claim 2 further comprising:
- a fourth means connected to said sector detector in said first means for generating a signal to the control unit that the disk file is within range of completing its padding to index operation so as to be ready to accept a polling operation from the control unit.

5. The apparatus as set forth in claim 3 further comprising:
- a fourth means connected to said sector detector in said first means for generating a signal to the control unit that the disk file is completing its padding to index operation and is ready to accept a polling operation from the control unit.

6. The apparatus as set forth in claim 1 further comprising:
- fifth means connected to said first means for inhibiting command to the disk file from the file control unit which would generate an error condition while a padding to zero operation is being performed by said disk file.

7. The apparatus as set forth in claim 3 further comprising:

fifth means connected to said first means for inhibiting command to the disk file from the file control unit which would generate an error condition while a padding to zero operation is being performed by said disk file.

8. The apparatus as set forth in claim 4 further comprising:

fifth means connected to said first means for inhibiting command to the disk file from the file control unit which would generate an error condition while a padding to zero operation is being performed by said disk file.

9. The apparatus as set forth in claim 5 further comprising:

fifth means connected to said first means for inhibiting command to the disk file from the file control unit which would generate an error condition while a padding to zero operation is being performed by said disk file.

10. A method of assuming control of a writing means in a data storage file to pad a cyclic data storage medium with null characters from the termination of variable length record data supplied from a source to an index point of said cyclic data storage medium, said source supplying predetermined command signals to command said data storage file for storing said variable length record data, said method comprising the steps of:

generating a continuing first sigal in response to a predetermined one of said command signals;

sensing said termination of said supplied data;

generating null character signals jointly in response to said first signal and said sensing step;

generating hold signals to maintain command of said data storage file for storing said null character signals;

sensing said index point of cyclic data storage medium to generate an index signal;

halting said null character generation in response to said index signal.

11. The method of claim 10 wherein said supplied predetermined command signals include a write gate command signal supplied from said source for the duration of said variable length record data, and an address mark command signal supplied from said source at the beginning of each variable length record, and wherein:

said first signal generating step occurs in response to said address mark command signal; and said sensing step comprises sensing the termination of said write gate command signal.

12. The method of claim 11 including the additional steps of:

sensing predetermined sectors of said cycle of said cyclic data storage medium; and supplying a pad on signal for said source in response to a predetermined command signal from said source and to a predetermined command signal from said source and to a predetermined status of said predetermined sector sensing step.

13. The method of claim 12 including the additional step of:

supplying an interrupt signal for said source in response to said hold signal generating step and to a predetermined status of said predetermined sector sensing step.

* * * * *

PO-1050
(5/69)

UNITED STATES PATENT OFFICE
CERTIFICATE OF CORRECTION

Patent No. 3,824,563 Dated July 16, 1974

Inventor(s) Fernando A. Luiz

It is certified that error appears in the above-identified patent and that said Letters Patent are hereby corrected as shown below:

On the Title Page: Change the inventor's name from Lutz to --Luiz--.

Signed and sealed this 29th day of October 1974.

(SEAL)
Attest:

McCOY M. GIBSON JR.
Attesting Officer

C. MARSHALL DANN
Commissioner of Patents